(12) United States Patent
Zhang

(10) Patent No.: US 11,023,085 B2
(45) Date of Patent: Jun. 1, 2021

(54) TOUCH PANEL AND CONTROL METHOD THEREOF, AND DISPLAY DEVICE

(71) Applicant: BOE TECHNOLOGY GROUP CO., LTD., Beijing (CN)

(72) Inventor: Hao Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/640,623

(22) PCT Filed: Mar. 7, 2019

(86) PCT No.: PCT/CN2019/077336
§ 371 (c)(1),
(2) Date: Feb. 20, 2020

(87) PCT Pub. No.: WO2020/177122
PCT Pub. Date: Sep. 10, 2020

(65) Prior Publication Data
US 2021/0019021 A1    Jan. 21, 2021

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01); *G06F 2203/04102* (2013.01)

(58) Field of Classification Search
CPC ................ G06F 3/0446; G06F 3/0416; G06F 2203/04102
See application file for complete search history.

(56) References Cited

U.S. PATENT DOCUMENTS

| 10,168,732 B2* | 1/2019 | Hung ................... G06F 3/04166 |
| 10,928,956 B2* | 2/2021 | Kitada ................. G06F 3/0414 |
| 2011/0210937 A1* | 9/2011 | Kee ..................... G06F 3/04164 345/174 |
| 2012/0120006 A1* | 5/2012 | Liu ....................... G06F 3/0443 345/173 |

(Continued)

FOREIGN PATENT DOCUMENTS

| CN | 104503627 A | 4/2015 |
| CN | 106445267 A | 2/2017 |

(Continued)

*Primary Examiner* — Amy Onyekaba
(74) *Attorney, Agent, or Firm* — The Webb Law Firm

(57) ABSTRACT

The present disclosure provides a touch panel and a control method thereof, and a display device. The touch panel includes: a plurality of touch electrodes, including a plurality of first electrodes not crossing with each other and including one or more first sub-electrodes located in a foldable area of the touch panel and a plurality of second electrodes not crossing with each other, wherein at least one of the plurality of second electrodes is disposed to be insulated from and crossing with at least one of the one or more first sub-electrodes, and at least one of the at least one of the one or more first sub-electrodes is configured to be connected to a first end at a first stage; and a first switching circuit configured to make the at least one of the plurality of second electrodes be connected to a second end at the first stage.

17 Claims, 4 Drawing Sheets

(56) References Cited

U.S. PATENT DOCUMENTS

| | | | |
|---|---|---|---|
| 2012/0162099 A1* | 6/2012 | Yoo | G06F 3/0445 |
| | | | 345/173 |
| 2014/0139447 A1* | 5/2014 | Kang | G06F 3/0446 |
| | | | 345/173 |
| 2015/0116608 A1* | 4/2015 | Jeong | G06F 3/0446 |
| | | | 349/12 |
| 2015/0169091 A1* | 6/2015 | Ho | G06F 3/0416 |
| | | | 345/173 |
| 2015/0185911 A1* | 7/2015 | Kim | H03K 17/9622 |
| | | | 349/12 |
| 2015/0242022 A1* | 8/2015 | Hung | G06F 3/04164 |
| | | | 345/174 |
| 2016/0370924 A1* | 12/2016 | Hou | G06F 3/04164 |
| 2017/0046003 A1* | 2/2017 | Huang | G06F 3/0443 |
| 2017/0102813 A1* | 4/2017 | Kuo | G06F 3/0443 |
| 2017/0131809 A1* | 5/2017 | Lin | G06F 3/04164 |
| 2018/0120615 A1 | 5/2018 | Wang et al. | |
| 2018/0151662 A1* | 5/2018 | Rhe | G06F 3/0412 |
| 2018/0203531 A1* | 7/2018 | Tsai | G06F 3/04164 |
| 2018/0321772 A1 | 11/2018 | Park et al. | |
| 2018/0329530 A1* | 11/2018 | Yu | G06F 3/0446 |
| 2019/0064958 A1* | 2/2019 | Liu | G06F 3/0446 |
| 2019/0212841 A1* | 7/2019 | Chang | G06F 3/0446 |
| 2020/0033992 A1* | 1/2020 | Kitada | G06F 3/04144 |

FOREIGN PATENT DOCUMENTS

| | | |
|---|---|---|
| CN | 106610743 A | 5/2017 |
| CN | 107329624 A | 11/2017 |

* cited by examiner

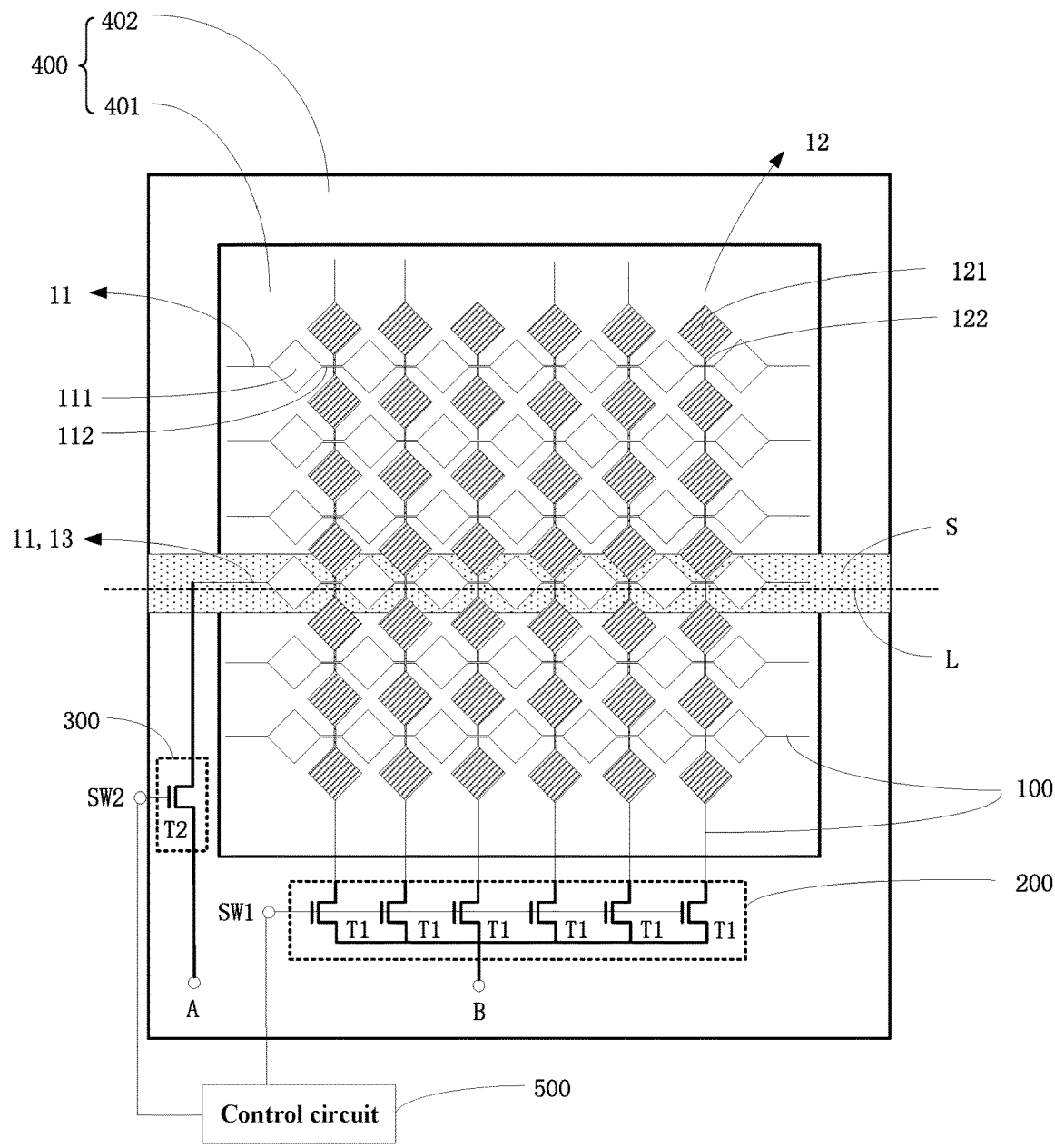

Fig. 4

Control the first switching circuit, in response to a first operation of a user, to make at least one of the at least one of the plurality of second electrodes disposed to be insulated from and crossing with the at least one of the one or more first sub-electrodes be connected to the second end at the first stage — 502

Determine a folding state of the touch panel according to at least one of an amount of charge at the second end or an amount of charge at the first end — 504

Fig. 5

TOUCH PANEL AND CONTROL METHOD THEREOF, AND DISPLAY DEVICE

CROSS-REFERENCE TO RELATED APPLICATIONS

The present application is a U.S. National Stage Application under 35 U.S.C. § 371 of International Patent Application No. PCT/CN2019/077336, filed on Mar. 7, 2019, the disclosure of which is incorporated by reference herein in its entirety.

TECHNICAL FIELD

The present disclosure relates to a touch panel and a control method thereof, and a display device.

BACKGROUND

With the development of display technology, there are more and more foldable and touchable display devices. In the related art, in order to detect a folding state of a display device, a folding sensor is additionally disposed in a display panel of the display device.

SUMMARY

According to one aspect of the embodiments of the present disclosure, a touch panel is provided. The touch panel comprises a plurality of touch electrodes, comprising: a plurality of first electrodes not crossing with each other and comprising one or more first sub-electrodes located in a foldable area of the touch panel, and a plurality of second electrodes not crossing with each other, wherein at least one of the plurality of second electrodes is disposed to be insulated from and crossing with at least one of the one or more first sub-electrodes, and at least one of the at least one of the one or more first sub-electrodes is configured to be connected to a first end at a first stage; and a first switching circuit configured to make the at least one of the plurality of second electrodes be connected to a second end at the first stage.

In some embodiments, the first switching circuit is configured to make each of the at least one of the plurality of second electrodes be connected to the second end at the first stage.

In some embodiments, the first switching circuit is further configured to make each of the at least one of the plurality of second electrodes be not connected to the second end at a second stage, wherein the second stage is before or after the first stage.

In some embodiments, the first switching circuit comprises at least one first switching transistor in one-to-one correspondence to the at least one of the plurality of second electrodes, and each of the at least one of the plurality of second electrodes is connected to the second end through a corresponding first switching transistor of the at least one first switching transistor, and wherein each of the at least one first switching transistor is configured to be turned on at the first stage and turned off at the second stage.

In some embodiments, the touch panel further comprises: a second switching circuit connected between the at least one of the one or more first sub-electrodes and the first end and configured to make the at least one of the at least one of the one or more first sub-electrodes be connected to the first end at the first stage.

In some embodiments, the second switching circuit is further configured to make each of the at least one of the one or more first sub-electrodes be not connected to the first end at the second stage.

In some embodiments, the second switching circuit comprises at least one second switching transistor in one-to-one correspondence to the at least one of the one or more first sub-electrodes, and each of the at least one of the one or more first sub-electrodes is connected to the second end through a corresponding second switching transistor of the at least one second switching transistor, and wherein each of the at least one second switching transistor is configured to be turned on at the first stage and turned off at the second stage.

In some embodiments, the plurality of first electrodes further comprise one or more second sub-electrodes located in a non-foldable area of the touch panel.

In some embodiments, an extending direction of a folding axis of the foldable area is in parallel to an extending direction of the one or more first sub-electrodes extends.

In some embodiments, each of the plurality of second electrodes is disposed to be insulated from and crossing with each of the one or more first sub-electrodes.

In some embodiments, a material of each of the first electrode and the second electrode comprises a metal.

In some embodiments, one of the first electrode and the second electrode is a driving electrode, and the other is a sensing electrode.

In some embodiments, each of the plurality of second electrodes is disposed to be insulated from and crossing with from each of the plurality of first electrodes.

In some embodiments, each of the plurality of first electrodes comprises a plurality of first electrode portions and a plurality of first connection portions connecting adjacent first electrode portions of the plurality of first electrode portions; and each of the plurality of second electrodes comprises a plurality of second electrode portions and a plurality of second connection portions connecting adjacent second electrode portions of the plurality of second electrode portions, wherein one of any two second connection portions of the plurality of second electrode portions is disposed to be insulated from and crossing with one of the plurality of first electrode portions, and the other is disposed to be insulated from and crossing with another of the plurality of first electrode portions.

In some embodiments, the plurality of first electrodes are arranged in parallel along a first direction, and the plurality of second electrodes are arranged in parallel along a second direction perpendicular to the first direction.

In some embodiments, the touch panel further comprises: a control circuit configured to, in response to a first operation by a user, control the first switching circuit to make the at least one of the plurality of second electrodes be connected to the second end at the first stage; and determine a folding state of the touch panel according to at least one of an amount of charge at the second end or an amount of charge at the first end.

According to another aspect of the embodiments of the present disclosure, a display device is provided. The display device comprises the touch panel according to any one of the above embodiments.

In some embodiments, the display device further comprises a display panel, wherein the plurality of touch electrodes is disposed on a surface of an encapsulation layer of the display panel.

In some embodiments, the display device further comprises: a control circuit configured to, in response to a first operation by the user, control the first switching circuit to make the at least one of the plurality of second electrodes be connected to a second end at the first stage; and determine a folding state of the touch panel according to at least one of an amount of charge at the second end or an amount of charge at the first end.

In some embodiments, the control circuit is further configured to control a second switching circuit, in response to the first operation, to make the at least one of the at least one of the one or more first sub-electrodes be connected to the first end at the first stage.

In some embodiments, the display panel has a plurality of display modes in one-to-one correspondence to a plurality of sets of data signals, the plurality of sets of data signals is configured to make the display panel display with a same color caste in any two display modes of the plurality of display modes; and wherein the control circuit is further configured to determine a set of data signals of the plurality of sets of data signals corresponding to the folding state of the touch panel according to the folding state of the touch panel, thereby controlling the display panel to display in a display mode of the plurality of display modes corresponding to the set of data signals of the plurality of sets of data signals.

In some embodiments, the control circuit is further configured to control the first switching circuit and the second switching circuit, in response to a second operation by the user, to make each of the at least one of the plurality of second electrodes be not connected to the second end at a second stage, and each of the at least one of the one or more first sub-electrodes be not connected to the first end at the second stage.

In some embodiments, at least one of the first switching circuit or the second switching circuit is disposed in a non-display area of the display panel.

In some embodiments, at least one of the first switching circuit or the second switching circuit is disposed in an integrated circuit bound to the display panel, wherein a driving circuit is disposed in the integrated circuit.

According to still another aspect of the embodiments of the present disclosure, a control method of a touch panel according to any one of the above embodiments is provided. The touch panel comprises: a plurality of touch electrodes, comprising: a plurality of first electrodes not crossing with each other and comprising one or more first sub-electrodes located in a foldable area of the touch panel, and a plurality of second electrodes not crossing with each other, wherein at least one of the plurality of second electrodes is disposed to be insulated from and crossing with at least one of the one or more first sub-electrodes, and at least one of the at least one of the one or more first sub-electrodes is configured to be connected to a first end at a first stage, and a first switching circuit connected between the at least one of the at least one of the plurality of second electrodes and a second end. The control method comprises: controlling the first switching circuit, in response to a first operation of a user, to make the at least one of the at least one of the plurality of second electrodes be connected to the second end at a first stage; and determining a folding state of the touch panel according to at least one of an amount of charge at the second end or an amount of charge at the first end.

In some embodiments, the control method further comprises: controlling a second switching circuit, in response to the first operation, to make the at least one of the at least one of the one or more first sub-electrodes be connected to the first end at the first stage, wherein the second switching circuit is connected between the at least one of the one or more first sub-electrodes and the first end.

In some embodiments, the control method further comprises: controlling the first switching circuit and the second switching circuit, in response to a second operation by a user, to make each of the at least one of the plurality of second electrodes be not connected to the second end at a second stage, and each of the at least one of the one or more first sub-electrodes be not connected to the first end at the second stage, wherein the second stage is before or after the first stage.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which:

FIG. 4 is a schematic structural view showing a display device according to another embodiment of the present disclosure;

FIG. 5 is a schematic flowchart showing a control method of a touch panel according to an embodiment of the present disclosure.

Figure 1:
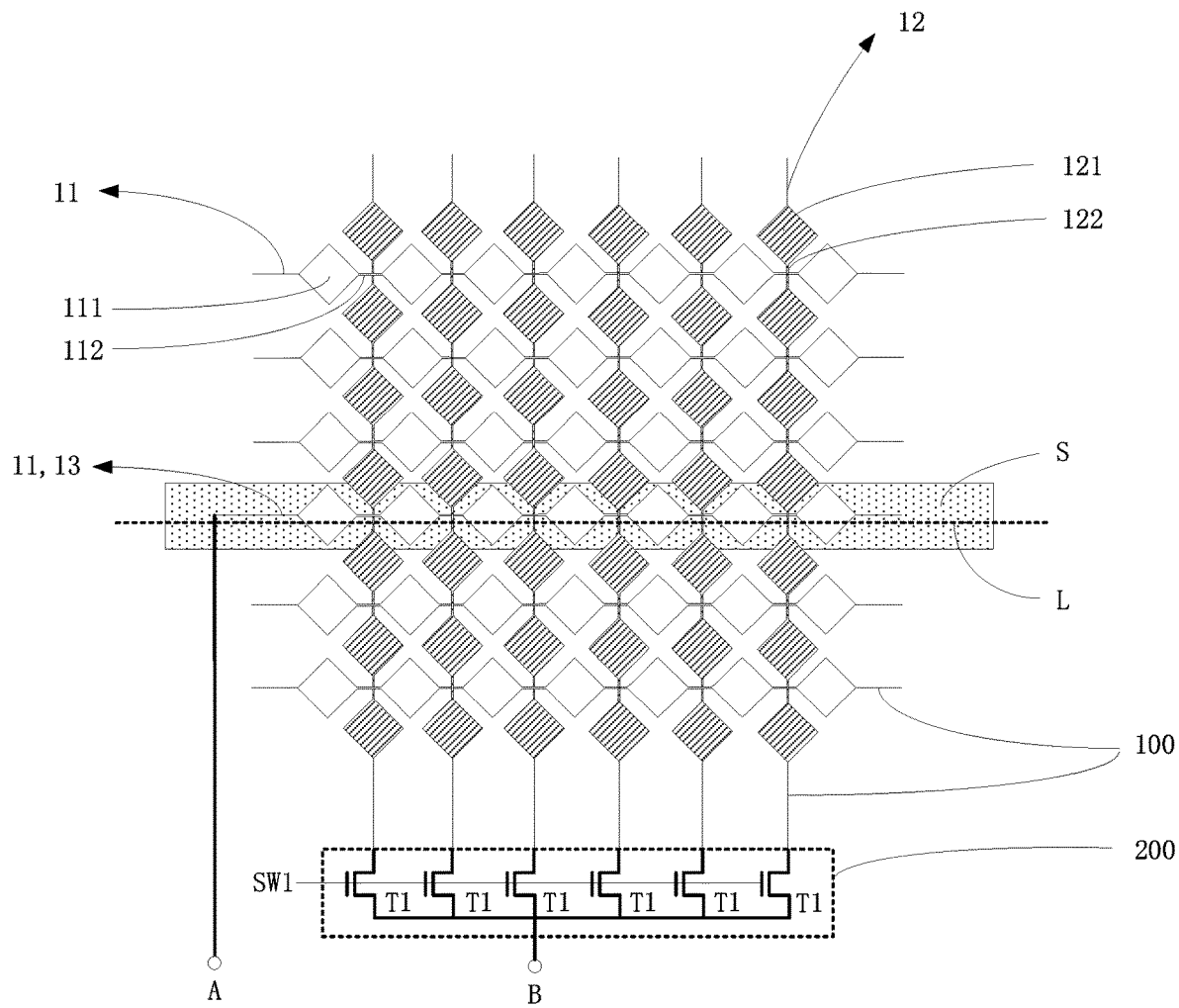
FIG. 1 is a schematic structural view showing a touch panel according to an embodiment of the present disclosure.

It should be understood that the dimensions of the various parts shown in the accompanying drawings are not necessarily drawn according to the actual scale. In addition, the same or similar reference signs are used to denote the same or similar components.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The inventor has noticed that, the folding sensor in the related art is usually disposed in a non-display area of a display panel of the display device. On one hand, the folding sensor needs to occupy the space of the display panel. On the other hand, since there is a limited space in the non-display area, the folding sensor has a limited size and thus has a low detection sensitivity in the case where the display device is folded.

The embodiments of the present disclosure provide a technical solution for implementing the function of a folding sensor by using touch electrodes in a touch panel, which will be explained below in conjunction with different embodiments.

FIG. 1 is a schematic structural view showing a touch panel according to an embodiment of the present disclosure.

As shown in FIG. 1, the touch panel comprises one or more foldable areas S and non-foldable areas other than the foldable areas S. Here, the foldable area S is an area where the touch panel is deformed during folding.

In some embodiments, each foldable area S may be an area formed by extending a certain distance towards both sides of a folding axis L from the folding axis L. For example, the folding axis L may extend a first predetermined distance toward one side of the folding axis L, and the folding axis L may extend a second predetermined distance toward the other side of the folding axis L, so that a foldable area S can be formed. Here, the first predetermined distance and the second predetermined distance may be the same or different.

Referring to FIG. 1, the touch panel comprises a plurality of touch electrodes 100 and a first switching circuit 200. The plurality of touch electrodes 100 comprise a plurality of first electrodes 11 not crossing with each other and a plurality of second electrodes 12 not crossing with each other.

The plurality of first electrodes 11 comprise one or more first sub-electrodes 13 located in the foldable area S. In some embodiments, the plurality of first electrodes 11 further comprise one or more second sub-electrodes located in the non-foldable area. It should be understood that, the first electrode 11 located in the folding area S is here referred to as a first sub-electrode 13, and the first electrode 11 located in the non-foldable area is referred to as a second sub-electrode. It should be also understood that, FIG. 1 shows a case where only one first electrode 11 is located in the foldable area S. In some embodiments, more than one first electrode 11 is located in the foldable area S. In some embodiments, the extending direction of the folding axis L of the foldable area is parallel to the extending direction of the first sub-electrode 13.

At least one of the plurality of second electrodes 12 is disposed to be insulated from and crossing with at least one of the one or more first sub-electrodes 13. In some embodiments, each of the plurality of second electrodes 12 in the touch panel is disposed to be insulated from and crossing with each of the one or more first sub-electrodes 13.

In the at least one of the one or more first sub-electrodes 13, at least one first sub-electrode is configured to be connected to a first end A at a first stage. For example, the first sub-electrode 13 may be directly connected to the first end A. For another example, the first sub-electrode 13 may be indirectly connected to the first end A, which will be introduced in detail later.

The first switching circuit 200 is configured to make at least one of the at least one of the plurality of second electrodes 12 which is disposed to be insulated from and crossing with the at least one first sub-electrode 13 be connected to the second end B at the first stage. In some embodiments, the first switching circuit 200 is further configured to make each of the at least one of the plurality of second electrodes 12 be not connected to the second end at a second stage. Here, the second stage is before or after the first stage.

In the above embodiments, at least one first sub-electrode 13 is connected to the first end A at the first stage, and at least one second electrode 12 is connected to the second end B at the first stage. Since the second electrode 12 is disposed to be insulated from and crossing with the first sub-electrode 13, a capacitance is formed between the second end B and the first end A. In the case where the touch panel switches between a non-folding mode and a folding mode, the capacitance between the second end B and the first end A will vary correspondingly, and the amount of charge at the second end B and the amount of charge at the first end A will also vary correspondingly. Therefore, the folding state of the touch panel may be determined according to at least one of the amount of charge at the second end B or the amount of charge at the first end A, without additionally a folding sensor provided.

In some embodiments, in the case where the touch panel switches from a non-folding mode to a folding mode, the capacitance between the second end B and the first end A will increase. When the amount of charge at the second end B and the first end A is detected, the voltage between the second end B and the first end A may be maintained constant, thus the amount of charge at the second end B and the amount of charge at the first end A will be also detected to increase correspondingly.

In some embodiments, the first switching circuit 200 is configured to make each of the aforementioned at least one of the plurality of second electrodes 12 be connected to the second end B at the first stage. In such embodiments, since each second electrode 12 is connected to the second end B at the first stage, the capacitance between the second end B and the first end A is increased and change in each of the amount of charge at the second end B and the amount of charge at the first end A is greater. Thus, the folding state of the touch panel can be determined more sensitively.

In some implementations, referring to FIG. 1, the first switching circuit 200 comprises at least one first switching transistor T1. The aforementioned at least one of the plurality of second electrodes 12 is in one-to-one correspondence to the at least one first switching transistor T1. Each second electrode 12 is connected to the second end B through a corresponding first switching transistor T1. Each first switching transistor T1 is configured to be turned on at the first stage, so that each second electrode 12 is connected to the second end B. Each first switching transistor T1 is also configured to be turned off at the second stage, so that each second electrode 12 is not connected to the second end B. For example, each first switching transistor T1 may be turned on at the first stage and turned off at the second stage under the control of a same first control signal SW1. For another example, each first switching transistor T1 may be turned on at the first stage and turned off at the second stage under the control of a respective control signal (not the same control signal).

For example, only one second electrode 12 is disposed to be insulated from and crossing with the first sub-electrode 13. In this case, the first switching circuit 200 may comprise only one first switching transistor T1.

For another example, more than one second electrode 12 is disposed to be insulated from and crossing with the first sub-electrode 13. In this case, the first switching circuit 200 may comprise more than one first switching transistor T1 in one-to-one correspondence to the more than one second electrode 12.

Figure 2:
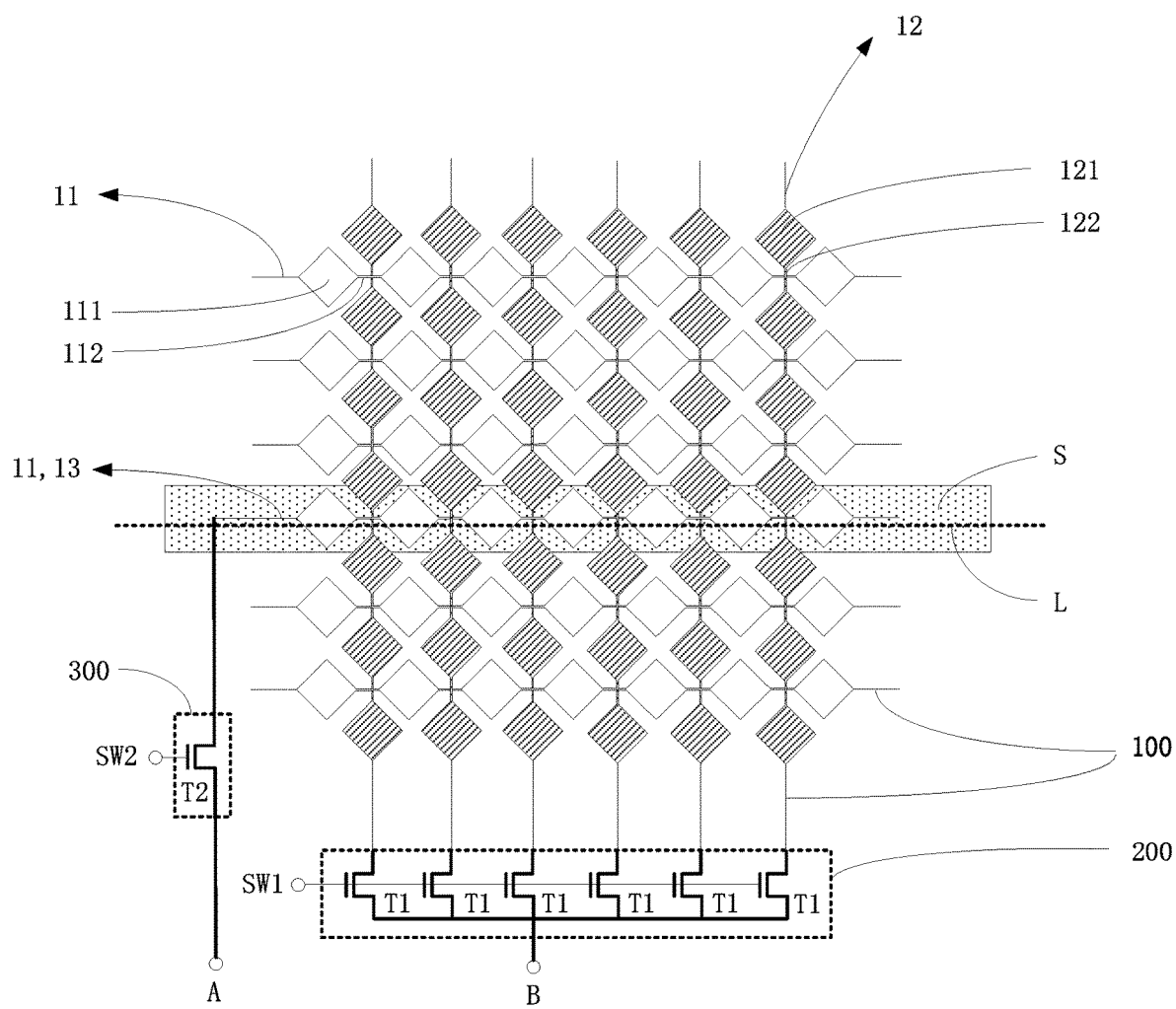
FIG. 2 is a schematic structural view showing a touch panel according to another embodiment of the present disclosure.

FIG. 2 is a schematic structural view showing a touch panel according to another embodiment of the present disclosure.

As shown in FIG. 2, the touch panel further comprises a second switching circuit 300 disposed between the first end A and one or more first sub-electrodes 13 that are disposed to be insulated from and crossing with the second electrode 12. The second switching circuit 300 is configured to make at least one of the first sub-electrodes 13 disposed to be insulated from and crossing with a second electrode 12 be connected to the first end A at the first stage. In some embodiments, the second switching circuit 300 is further configured to make each of the first sub-electrodes 13 disposed to be insulated from and crossing with a second electrode 12 be not connected to the first end A at the second stage.

For example, the second switching circuit 300 may be configured to make each of the first sub-electrodes 13 disposed to be insulated from and crossing with the second electrode 12 be connected to the first end A at the first stage. In such embodiments, since each of the first sub-electrodes 13 disposed to be insulated from and crossing with the second electrode 12 is connected to the second end A, the capacitance between the second end B and the first end A is increased and change in each of the amount of charge at the second end B and the amount of charge at the first end A is greater. Thus, the folding state of the touch panel may be determined more sensitively.

In some implementations, referring to FIG. 2, the second switching circuit 300 comprises at least one second switching transistor T2. The at least one first sub-electrode 13 disposed to be insulated from and crossing with at least one of the plurality of second electrodes 12 is in one-to-one correspondence to the at least one second switching transistor T2. Each first sub-electrode 13 is connected to the first end A through a corresponding second switching transistor T2. Each second switching transistor T2 is configured to be turned on at the first stage so that each first sub-electrode 13 is connected to the first end A. Each second switching transistor T2 is also configured to be turned off at the second stage so that each first sub-electrode 13 is not connected to the first end A. For example, each second switching transistor T2 may be turned on at the first stage and turned off at the second stage under the control of a same second control signal SW2. For another example, each second switching transistor T2 may be turned on at the first stage and turned off at the second stage under the control of a respective control signal (not the same control signal).

For example, only one first sub-electrode 13 is located in the foldable area S. In this case, the second switching circuit 300 may comprise only one second switching transistor T2.

For another example, more than one first sub-electrode 13 is located in the foldable area S. In this case, the second switching circuit 300 may comprise more than one second switching transistor T2 in one-to-one correspondence to the more than one first sub-electrode 13.

It should be understood that, although the touch panel shown in FIG. 2 comprises a second switching circuit 300, in some embodiments, the second switching circuit 300 may not be necessary. For example, in the case where only one first sub-electrode 13 is located in the foldable area S, the only one first sub-electrode 13 may be directly connected to the first end A without through the second switching circuit 300. In other words, the only one first sub-electrode 13 may be always connected to the first end A.

It should also be understood that the first switching transistor T1 and the second switching transistor T2 may be an N-type thin film transistor (TFT) or a P-type TFT. For example, in the case where the first switching transistor T1 and the second switching transistor T2 are both N-type TFTs, the second control signal SW2 and the first control signal SW1 are both at high levels at the first stage and both at glow levels at the second stage; in the case where the first switching transistor T1 and the second switching transistor T2 are both P-type TFTs, the second control signal SW2 and the first control signal SW1 are both at low levels at the first stage and both at high levels at the second stage. In addition, in some embodiments, in the case where the first switching transistor T1 and the second switching transistor T2 are of a same conductive type, the second control signal SW2 and the first control signal SW1 may be a same signal.

In some embodiments, the first switching circuit 200 is configured to make each of the second electrodes 12 disposed to be insulated from and crossing with the first sub-electrodes 13 be connected to the second end B at the first stage, and the second switching circuits 300 are configured to make each of the first sub-electrodes 13 disposed to be insulated from and crossing with the second electrodes 12 is connected to the first end A at the first stage. In such embodiments, since each of the second electrodes 12 disposed to be insulated from and crossing with the first sub-electrode 13 is connected to the second end B, and each of the first electrodes disposed to be insulated from and crossing with the second electrodes 12 is connected to the second end A. Therefore, the capacitance between the second end B and the first end A is further increased and a change in each of the amount of charge at the second end B and the amount of charge at the first end A is greater. Thus, the folding state of the touch panel may be further determined more sensitively.

In some embodiments, referring to FIG. 1, each of the plurality of second electrodes 12 may be disposed to be insulated from and crossing with each of the plurality of first electrodes 11. However, the present disclosure is not limited thereto. For example, in some embodiments, some second electrodes 12 or a certain second electrode 12 are/is disposed to be insulated from and crossing with some but not the whole of the plurality of first electrodes 11. As some examples, the material of each of the first electrode 11 and the second electrode 12 may comprise a metal.

In some embodiments, referring to FIG. 1, each first electrode 11 comprises a plurality of first electrode portions 111 and a plurality of first connection portions 112 connecting adjacent first electrode portions 111. Each second electrode 12 comprises a plurality of second electrode portions 121 and a plurality of second connection portions 122 connecting adjacent second electrode portions 121. Different second connection portions 122 are disposed to be insulated from and crossing with different first connection portions 112. In other words, one of any two second connection portions of the plurality of second electrode portions is disposed to be insulated from and crossing with one of the plurality of first electrode portions, and the other is disposed to be insulated from and crossing with another of the plurality of first electrode portions. For example, for the plurality of second connection portions 122 in a certain second electrode 12, different second connection portions 122 are disposed to be insulated from and crossing with one first connection portion 112 in different first electrodes 11. In some examples, the first electrode portion 111 and the second electrode portion 121 may be in a shape of rhombus, mesh, or the like.

In some embodiments, the plurality of first electrodes 11 are arranged in parallel along a first direction, and the plurality of second electrodes 12 are disposed in parallel along a second direction perpendicular to the first direction. For example, in the case where the touch panel is applied to a display device, the first direction may be a row direction of the pixel arrangement in the display panel, and the second direction may be a column direction of the pixel arrangement in the display panel, and vice versa.

In some embodiments, one of the first electrode 11 and the second electrode 12 in the touch panel is a driving electrode, and the other is a sensing electrode. For example, the first electrode 11 is a driving electrode while the second electrode 12 is a sensing electrode. For another example, the first electrode 11 is a sensing electrode while the second electrode 12 is a driving electrode. A capacitance can be formed between a driving electrode and a sensing electrode insulated from and crossing with each other. When an outside object (e.g. a finger) touches a position of the touch panel, a change in the capacitance between the driving electrode and the sensing electrode near the position is generated. For example, an excitation signal may be applied to each of the plurality of driving electrodes sequentially, and all the sensing electrodes insulated from and crossing with each of the plurality of driving electrodes will receive a sensing signal. The capacitance between each driving electrode and each sensing electrode can be determined based on the sensing signal and the touch position can be identified.

Figure 3:
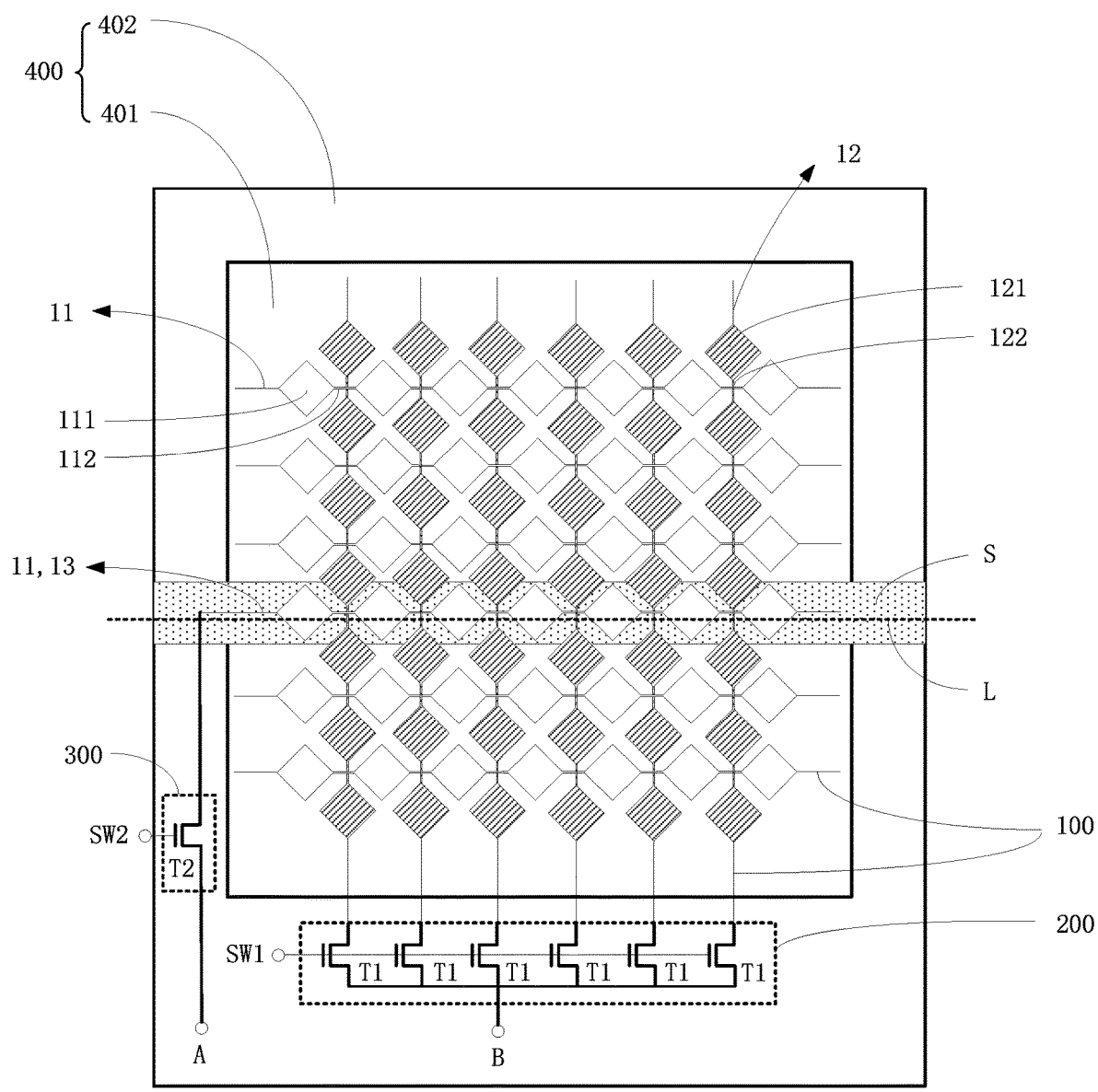
FIG. 3 is a schematic structural view showing a display device according to an embodiment of the present disclosure.

FIG. 3 is a schematic structural view showing a display device according to an embodiment of the present disclosure.

As shown in FIG. 3, the display device comprises the touch panel according to any one of the above embodiments. In some embodiments, the display device may be, for example, any product or member having a display function, such as a mobile terminal, a television, a display, a notebook computer, a digital photo frame, a navigator, or an electronic paper.

In some embodiments, referring to FIG. 3, the display device further comprises a display panel 400 provided with a plurality of touch electrodes 100 in the touch panel on a surface of an encapsulation layer of the display panel 400. For example, the display panel 400 may be an OLED (Organic Light Emitting Diode) display panel. The OLED display panel may comprise, for example, a base substrate, a driving circuit layer located on the base substrate, an OLED located on the driving circuit layer, and a thin film encapsulation layer covering the OLED. The plurality of touch electrodes 100 may be disposed on the surface of the thin film encapsulation layer.

In some implementations, referring to FIG. 3, at least one of the first switching circuit 200 or the second switching circuit 300 may be disposed in a non-display area 402 of the display panel 400, that is, an area around a display area 401. For example, the first switching circuit 200 and the second switching circuit 300 may be disposed in an array substrate of the display panel 400.

In other implementations, at least one of the first switching circuit 200 or the second switching circuit 300 may be disposed in an integrated circuit, such as a flexible circuit board (FPC), which is bound to the display panel 400. Here, the integrated circuit is provided with a driving circuit, such as a gate driving circuit or a source driving circuit. In this manner, it helps to reduce the border of the display panel.

In still other implementations, one of the first switching circuit 200 or the second switching circuit 300 is disposed in the non-display area of the display panel 400, while the other is disposed in the integrated circuit bound to the display panel 400.

FIG. 4 is a schematic structural view showing a display device according to another embodiment of the present disclosure.

Compared to the embodiment shown in FIG. 3, the display device shown in FIG. 4 further comprises a control circuit 500. The control circuit 500 is configured to control the first switching circuit 200, in response to a first operation by a user, to make at least one of the one or more second electrodes 12 disposed to be insulated from and crossing with at least one first sub-electrode 13 be connected to the second end B at the first stage.

For example, the display device has a folding mode and a non-folding mode. The first operation of a user is an operation of selecting the folding mode, and the second operation of a user is an operation of selecting the non-folding mode. For example, a user may touch a button to select the folding mode and touch another button to select the non-folding mode. For another example, a user may slide a button along a first direction to select the folding mode and slide the button along a second direction opposite to the first direction to select the non-folding mode.

For example, in response to a first operation of a user (e.g., selecting a folding mode), the control circuit 500 may control each first switching transistor T1 in the first switching circuit 200 to be turned on by controlling the level of the first control signal SW1.

The control circuit 500 is further configured to determine a folding state of the touch panel according to at least one of the amount of charge at the second end B or the amount of charge at the first end A.

For example, by maintaining a constant voltage between the first end A and the second end B, the folding state of the touch panel can be determined according to at least one of the amount of charge at the first end A or the amount of charge at the second end B. For example, the control circuit 500 may store the correspondence between the amount of charge at the first end A and the folding angle of the touch panel. After the amount of charge at the first end A is obtained, the folding angle of the touch panel may be determined according to the stored correspondence. For another example, the control circuit 500 may store the correspondence between the amount of charge at the second end B and the folding angle of the touch panel. After the amount of charge at the second end B is obtained, the folding angle of the touch panel may be determined according to the stored correspondence. For another example, the control circuit 500 may store the correspondence between the amount of charge at the second end B, the amount of charge at the first end A, and the folding angle of the touch panel. After the amount of charge at the second end B and amount of the charge at the first end A are obtained, the folding angle of the touch panel may be determined according to the stored correspondence.

In some embodiments, the control circuit 500 is further configured to control the second switching circuit 300, in response to a first operation of the user, to make at least one of the one or more first sub-electrodes 13 disposed to be insulated from and crossing with the second electrode 12 be connected to the first end A at the first stage.

For example, in response to a second operation by a user (e.g., selecting a non-folding mode), the control circuit 500 may control each second switching transistor T2 in the second switching circuit 300 to be turned on by controlling the level of the second control signal SW2.

In some embodiments, the control circuit 500 is further configured to control the first switching circuit 200 and the second switching circuit 300, in response to a second operation of the user, to make each of one or more second electrodes 12 disposed to be insulated from and crossing with the first sub-electrode 13 be not connected to the second end B at the second stage, and to make each of one or more first sub-electrodes 13 disposed to be insulated from and crossing with the second electrode 12 be not connected to the first end A at the second stage. It should be understood that in the case where each first sub-electrode 13 is not connected to the first end A, and each second electrode 12 is not connected to the second end B, the plurality of first electrodes 11 and the plurality of second electrodes 12 in the touch panel may be configured to sense a touch operation from outside. In this case, the touch position may be accurately determined based on the capacitance between each first electrode 11 and each second electrode 12.

Next, an application scenario will be listed. In this application scenario, the display device is currently in a non-folding mode, and a user is desired to fold the display device.

First, before the display device is folded, the user may select a folding mode by a first operation. After the user selects the folding mode, the control circuit 500 controls the first switching circuit 200 and the second switching circuit 300, so that at least one of the one or more second electrodes 12 disposed to be insulated from and crossing with the first sub-electrode 13 is connected to the second end B, and at least one of the one or more first sub-electrodes 13 disposed to be insulated from and crossing with the second electrode 12 is connected to the first end A.

After that, the user may select the non-folding mode by a second operation. After the user selects the non-folding mode, the control circuit 500 controls the first switching circuit 200 and the second switching circuit 300, so that each of the one or more second electrodes 12 disposed to be insulated from and crossing with the first sub-electrode 13 is not connected to the second end B, and each of the one or more first sub-electrodes 1 disposed to be insulated from and crossing with the second electrode 12 is not connected to the first end A.

In this way, a switch between the folding mode and the non-folding mode is made.

It should be understood that, in the above example, the first stage may be a time period between the first operation and the second operation of the user, and the second stage may be a time period after the second operation of the user or before the first operation of the user.

In some embodiments, the display panel may have a plurality of display modes correspond to a plurality of sets of data signals. The plurality of sets of data signals is configured such that the display panel displays with a same color cast in any two display modes. The control circuit 500 is further configured to determine a set of data signals of plurality of sets of data signals corresponding to the folding state of the touch panel according to the folding state of the touch panel, thereby controlling the display panel to display in a display mode of the plurality of display modes corresponding to the set of data signals of plurality of sets of data signals.

For example, the control circuit 500 may store in advance the correspondence between different folding angles and different sets of data signals. A set of data signals corresponding to the folding angle of the touch panel may be determined according to the folding angle of the touch panel. The determined set of data signals is input to the display panel by a source driver, and thus the display panel displays in a display mode corresponding to the data signals.

In some embodiments, the touch panel may comprise the control circuit 500 introduced above. The control circuit 500 is at least configured to control the first switching circuit 200, in response to a first operation by a user, to make at least one of the one or more second electrodes 12 disposed to be insulated from and crossing with at least one first sub-electrode 13 be connected to the second end B at the first stage; and determine the folding state of the touch panel according to at least one of the amount of charge at the second end B or the amount of charge at the first end A. In other embodiments, the control circuit 500 may also be configured to perform other operations introduced above.

FIG. 5 is a schematic flowchart showing a control method of a touch panel according to an embodiment of the present disclosure. The touch panel here may be the touch panel according to any one of the above embodiments.

At step 502, the first switching circuit is controlled, in response to a first operation of a user, to make at least one of the at least one of the plurality of second electrodes disposed to be insulated from and crossing with the at least one of the one or more first sub-electrodes be connected to the second end at the first stage.

In some embodiments, the first sub-electrode may be directly connected to the first end.

In other embodiments, the first sub-electrode may be connected to the first end through a second switching circuit. In this case, in response to the first operation by the user, the second switching circuit may also be controlled to make at least one of the at least one of the one or more first sub-electrodes be connected to the first end at the first stage.

At step 504, a folding state of the touch panel is determined according to at least one of an amount of charge at the second end or an amount of charge at the first end.

In the above embodiments, at least one of the at least one of the plurality of second electrodes disposed to be insulated from and crossing with the at least one of the one or more first sub-electrodes first sub-electrode may be connected to the second end by controlling the first switching circuit. Furthermore, the folding state of the touch panel may be determined based on at least one of the amount of charge at the second end or the amount of charge at the first end.

The touch panel may be applied to a display device. In some embodiments, the display panel of the display device has a plurality of display modes in one-to-one correspondence to plurality of sets of data signals. The plurality of sets of data signals is configured to make the display panel display with a same color cast in any two display modes. The control method may further comprise a step in which a set of data signals of the plurality of sets of data signals corresponding to the folding state of the touch panel is determined according to the folding state of the touch panel, and the display panel is controlled to display in a display mode corresponding to the set of data signals.

In some embodiments, the first switching circuit and the second switching circuit are controlled, in response to a second operation by a user, to make each of the at least one of the plurality of second electrodes be not connected to the second end at the second stage, and to make each of the at least one of the one or more first sub-electrodes be not connected to the first end at the second stage. In this way, the touch panel may be switched between a folding mode and a non-folding mode.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A touch panel, comprising:
   a plurality of touch electrodes, comprising:
      a plurality of first electrodes not crossing with each other and comprising one or more first sub-electrodes located in a foldable area of the touch panel, and
      a plurality of second electrodes not crossing with each other, wherein at least one of the plurality of second electrodes is disposed to be insulated from and crossing with at least one of the one or more first sub-electrodes, and at least one of the at least one of the one or more first sub-electrodes is configured to be connected to a first end at a first stage;
   a first switching circuit configured to make the at least one of the plurality of second electrodes be connected to a second end at the first stage; and
   a control circuit configured to, in response to a first operation by a user, control the first switching circuit to make the at least one of the plurality of second electrodes be connected to the second end at the first stage; and determine a folding state of the touch panel according to at least one of an amount of charge at the second end or an amount of charge at the first end.

2. The touch panel according to claim 1, wherein the first switching circuit is configured to make each of the at least one of the plurality of second electrodes be connected to the second end at the first stage.

3. The touch panel according to claim 1, wherein the first switching circuit is further configured to make each of the at least one of the plurality of second electrodes be not connected to the second end at a second stage, wherein the second stage is before or after the first stage.

4. The touch panel according to claim 3, wherein the first switching circuit comprises at least one first switching transistor in one-to-one correspondence to the at least one of the plurality of second electrodes, and each of the at least one of the plurality of second electrodes is connected to the second end through a corresponding first switching transistor of the at least one first switching transistor, and
   wherein each of the at least one first switching transistor is configured to be turned on at the first stage and turned off at the second stage.

5. The touch panel according to claim 3, further comprising:
   a second switching circuit connected between the at least one of the one or more first sub-electrodes and the first end and configured to make the at least one of the at least one of the one or more first sub-electrodes be connected to the first end at the first stage.

6. The touch panel according to claim 5, wherein the second switching circuit is further configured to make each of the at least one of the one or more first sub-electrodes be not connected to the first end at the second stage.

7. The touch panel according to claim 6, wherein the second switching circuit comprises at least one second switching transistor in one-to-one correspondence to the at least one of the one or more first sub-electrodes, and each of the at least one of the one or more first sub-electrodes is connected to the second end through a corresponding second switching transistor of the at least one second switching transistor, and
   wherein each of the at least one second switching transistor is configured to be turned on at the first stage and turned off at the second stage.

8. The touch panel according to claim 1, wherein the plurality of first electrodes further comprise one or more second sub-electrodes located in a non-foldable area of the touch panel.

9. The touch panel according to claim 1, wherein an extending direction of a folding axis of the foldable area is in parallel to an extending direction of the one or more first sub-electrodes extends.

10. The touch panel according to claim 1, wherein each of the plurality of second electrodes is disposed to be insulated from and crossing with from each of the plurality of first electrodes.

11. The touch panel according to claim 10, wherein:
    each of the plurality of first electrodes comprises a plurality of first electrode portions and a plurality of first connection portions connecting adjacent first electrode portions of the plurality of first electrode portions; and
    each of the plurality of second electrodes comprises a plurality of second electrode portions and a plurality of second connection portions connecting adjacent second electrode portions of the plurality of second electrode portions,
    wherein one of any two second connection portions of the plurality of second electrode portions is disposed to be insulated from and crossing with one of the plurality of first electrode portions, and the other is disposed to be insulated from and crossing with another of the plurality of first electrode portions.

12. The touch panel according to claim 11, wherein the plurality of first electrodes are arranged in parallel along a first direction, and the plurality of second electrodes are arranged in parallel along a second direction perpendicular to the first direction.

13. A display device, comprising:
   a touch panel, comprising:
      a plurality of touch electrodes, comprising:
         a plurality of first electrodes not crossing with each other and comprising one or more first sub-electrodes located in a foldable area of the touch panel, and
         a plurality of second electrodes not crossing with each other, wherein at least one of the plurality of second electrodes is disposed to be insulated from and crossing with at least one of the one or more first sub-electrodes, and at least one of the at least one of the one or more first sub-electrodes is configured to be connected to a first end at a first stage; and
      a first switching circuit configured to make the at least one of the plurality of second electrodes be connected to a second end at the first stage;
   a display panel, wherein the plurality of touch electrodes is disposed on a surface of an encapsulation layer of the display panel; and
   a control circuit configured to, in response to a first operation by a user, control the first switching circuit to make the at least one of the plurality of second electrodes be connected to a second end at the first stage; and determine a folding state of the touch panel according to at least one of an amount of charge at the second end or an amount of charge at the first end.

14. The display device according to claim 13, wherein the display panel has a plurality of display modes in one-to-one correspondence to a plurality of sets of data signals, the plurality of sets of data signals is configured to make the display panel display with a same color caste in any two display modes of the plurality of display modes; and
   wherein the control circuit is further configured to determine a set of data signals of the plurality of sets of data signals corresponding to the folding state of the touch panel according to the folding state of the touch panel, thereby controlling the display panel to display in a display mode of the plurality of display modes corresponding to the set of data signals of the plurality of sets of data signals.

15. A control method of a touch panel, wherein the touch panel comprises:
   a plurality of touch electrodes, comprising:
      a plurality of first electrodes not crossing with each other and comprising one or more first sub-electrodes located in a foldable area of the touch panel, and
      a plurality of second electrodes not crossing with each other, wherein at least one of the plurality of second electrodes is disposed to be insulated from and crossing with at least one of the one or more first sub-electrodes, and at least one of the at least one of the one or more first sub-electrodes is configured to be connected to a first end at a first stage, and
   a first switching circuit connected between the at least one of the at least one of the plurality of second electrodes and a second end;
   where the control method comprises:
   controlling the first switching circuit, in response to a first operation of a user, to make the at least one of the at least one of the plurality of second electrodes be connected to the second end at a first stage; and
   determining a folding state of the touch panel according to at least one of an amount of charge at the second end or an amount of charge at the first end.

16. The control method according to claim 15, further comprising:
   controlling a second switching circuit, in response to the first operation, to make the at least one of the at least one of the one or more first sub-electrodes be connected to the first end at the first stage, wherein the second switching circuit is connected between the at least one of the one or more first sub-electrodes and the first end.

17. The control method according to claim 16, further comprising:
   controlling the first switching circuit and the second switching circuit, in response to a second operation by the user, to make each of the at least one of the plurality of second electrodes be not connected to the second end at a second stage, and each of the at least one of the one or more first sub-electrodes be not connected to the first end at the second stage, wherein the second stage is before or after the first stage.

* * * * *

UNITED STATES PATENT AND TRADEMARK OFFICE
CERTIFICATE OF CORRECTION

PATENT NO. : 11,023,085 B2
APPLICATION NO. : 16/640623
DATED : June 1, 2021
INVENTOR(S) : Hao Zhang It is certified that error appears in the above-identified patent and that said Letters Patent is hereby corrected as shown below:

On the Title Page

Column 2, item (57) Abstract, Lines 10-11, delete "at least one of the at least one of the" and insert -- at least one of the --

In the Claims

Column 13, Lines 55-56, Claim 1, delete "at least one of the at least one of the" and insert -- at least one of the --

Column 14, Lines 24-25, Claim 5, delete "at least one of the at least one of the" and insert -- at least one of the --

Column 15, Lines 20-21, Claim 13, delete "at least one of the at least one of the" and insert -- at least one of the --

Column 15, Line 23, Claim 13, delete "stage;" and insert -- stage, --

Column 15, Line 28, Claim 13, delete "laver" and insert -- layer --

Column 16, Lines 15-16, Claim 15, delete "at least one of the at least one of the" and insert -- at least one of the --

Column 16, Lines 18-19, Claim 15, delete "at least one of the at least one of the" and insert -- at least one of the --

Column 16, Lines 23-24, Claim 15, delete "at least one of the at least one of the" and insert -- at least one of the --

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*

Column 16, Lines 32-33, Claim 16, delete "at least one of the at least one of the" and insert -- at least one of the --